March 13, 1928.

J. C. PARKER 1,662,279

HANDHOLE COVER

Filed Sept. 2, 1922

WITNESS:
Joseph J. Cohen.

INVENTOR
John C. Parker
BY
Butler Denny
ATTORNEY

Patented Mar. 13, 1928.

1,662,279

UNITED STATES PATENT OFFICE.

JOHN C. PARKER, OF PHILADELPHIA, PENNSYLVANIA.

HANDHOLE COVER.

Application filed September 2, 1922. Serial No. 586,004.

My improvements are designed to provide means whereby the leaks occasionally occurring around the joints of hand-hole covers of junction boxes, boiler sheets, or the like, may be temporarily stopped until the boiler can be conveniently emptied to regrind the joints. In my usual practice, the hand-holes of junction boxes and boiler sheets are closed by cover plates commonly having flanges with spheroidal surfaces ground on conical seats of the sheet to make tight joints, but it is not unusual for such joints to leak and require regrinding necessitating the emptying of the boiler. By improvements such leaking joints are stopped by the insertion between the plate and hole-wall of a packing ring forced into a tight wedging engagement therewith by a gland which may be drawn up tightly by means of the usual cover plate bolt or stud. The packing ring is preferably seated in a peripheral channel formed by a bead on the cover plate or gland or both, and the gland preferably comprises a ring fitting within the wall of the hole and having radial arms connected with a hub through which the cover-plate bolt passes.

The characteristic features of my invention will more fully appear from the following description of a preferred embodiment thereof and the accompanying drawing in illustration of the same.

Figure 1:
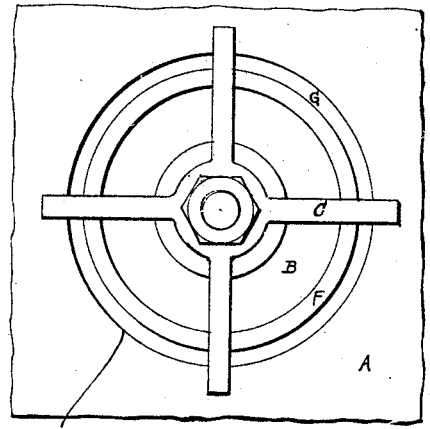
Figure 2:
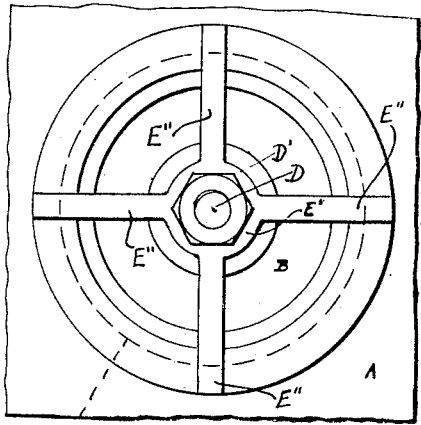
Figure 3:
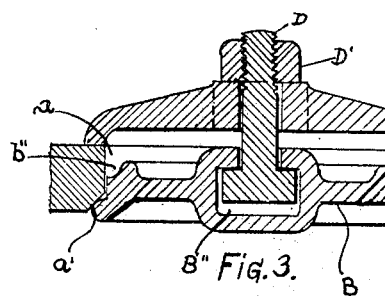
Figure 4:
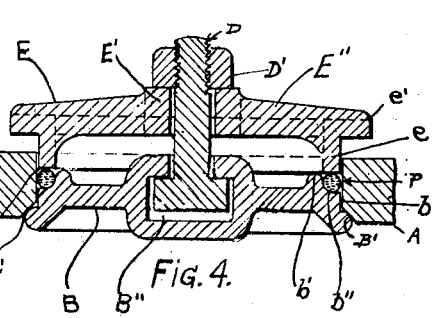
Figure 5:
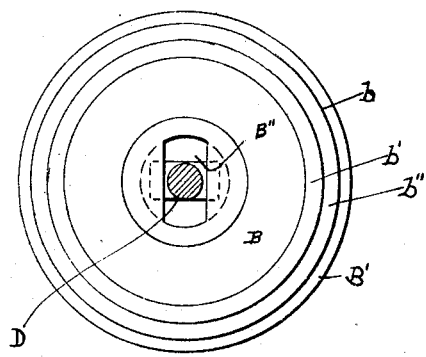
Figure 6:
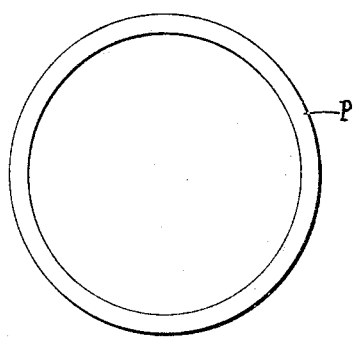

In the drawings, Fig. 1 is an elevation of a sheet containing a hand-hole closed by a cover plate adapted for use in accordance with my invention but without the packing or gland applied thereto; Fig. 2 is an elevation of the sheet and plate shown in Fig. 1 with the packing ring and gland applied thereto; Fig. 3 is a transverse sectional view of the construction shown in Fig. 1; Fig. 4 is a transverse sectional view of the construction shown in Fig. 2; Fig. 5 is an elevation of a detached cover plate; and Fig. 6 is an elevation of a detached packing ring.

As shown in the drawings, a sheet A contains the circular hand-hole A' having the wall $a$ and the conical seat $a'$. The hole A' is closed by a cover plate comprising a web B from which projects inwardly a flange B' having a spheroidal surface engaging and ground on the seat $a'$; the web having a cylindrical periphery $b$ disposed within the the hole A' and a rib or bead $b'$ on its outer surface forming a peripheral channel $b''$.

The flange B' is normally ground on the seat $a'$ to make a tight joint and the cover plate is held in place by a T-bolt D having its head engaged in the undercut socket B'' of the plate and its shank passing through the hub of a spider C resting on the sheet A, a nut D' drawing the cover up tight.

If the joint begins to leak while there is pressure on the boiler, the nut D' and spider C are removed and a packing ring P, of soft copper, rubber, asbestos or other suitable material, is inserted in the channel $b''$.

A gland E, comprising a hub E' adapted to be sleeved on the bolt D, radial arms E'' connecting the hub with the cylindrical ring $e$, and the peripheral flange $e'$, is inserted in the hole A' so that the ring $e$ engages the packing ring P. The gland is then drawn up by means of the nut D' to spread the packing ring P against the plate and the wall $a$ of the hole, thereby making a tight joint.

It will be understood that when there is pressure on the boiler, the cover plate is held on its seat by such pressure, rendering the spider C unnecessary, and that drawing up the gland to force the packing against the finished wall $a$ and the plate has no tendency to push the cover inwards because the pressure on the packing is balanced by the "pull" on the cover by the bolt. The friction of the tightening packing against the finished circular wall $a$ also tends to draw the plate outwards or tighter against its seat.

An advantage of my improvements is that the area of the gland ring and packing exposed to pressure is small as compared with the area of an outside plate for covering the whole area of a hole with a leaking joint, hence lighter bolts and other parts may be used. The gland also indicates the covers requiring regrinding when the boiler is emptied for cleaning and repairs, the gland being easily removed by unscrewing the nut D' and inserting a tool between the flange $e'$ and the sheet A.

Having described my invention, I claim:—

The combination with a sheet having a hand hole therein, of a cover forming with said sheet an internal continuous ground joint and an external channel, an elastic packing in said channel, and means for pressing said packing in its channel to form a tight continuous external joint.

In testimony whereof I have hereunto set my name this 1st day of September, 1922.

J. C. PARKER.